(12) United States Patent
Olsen, Jr.

(10) Patent No.: US 7,168,575 B2
(45) Date of Patent: Jan. 30, 2007

(54) CEILING MOUNTED, ADJUSTABLE MOTORCYCLE STABILIZER

(76) Inventor: Ronald Paul Olsen, Jr., 323 Heritage Rd., Cedar Falls, IA (US) 50613

( * ) Notice: Subject to any disclaimer, the term of this patent is extended or adjusted under 35 U.S.C. 154(b) by 261 days.

(21) Appl. No.: 10/342,569

(22) Filed: Jan. 15, 2003

(65) Prior Publication Data

US 2003/0146256 A1    Aug. 7, 2003

(51) Int. Cl.
*A47F 5/00* (2006.01)
(52) U.S. Cl. ............................ 211/17; 211/21
(58) Field of Classification Search .............. 211/17, 211/18, 19, 20, 21, 22, 23, 24
See application file for complete search history.

(56) References Cited

U.S. PATENT DOCUMENTS

| | | | | |
|---|---|---|---|---|
| 618,999 A | * | 2/1899 | Sayer | 211/17 |
| 1,964,119 A | * | 6/1934 | Hendry | 414/427 |
| 2,803,349 A | * | 8/1957 | Talbot | 211/22 |
| 4,202,529 A | * | 5/1980 | Fitting | 254/89 H |
| 4,523,882 A | * | 6/1985 | Hengesbach | 408/236 |
| 4,555,029 A | * | 11/1985 | Fiol | 211/22 |
| 4,606,082 A | * | 8/1986 | Kuhlman | 4/561.1 |
| 4,667,914 A | * | 5/1987 | Bailey | 248/286.1 |
| 4,840,278 A | * | 6/1989 | Gelinas | 211/18 |
| 5,121,890 A | * | 6/1992 | Komada | 248/122.1 |
| 5,664,687 A | * | 9/1997 | Liatti | 211/17 |
| 6,095,344 A | * | 8/2000 | White | 211/17 |
| 6,662,983 B2 | * | 12/2003 | Lane et al. | 224/405 |
| 6,691,878 B1 | * | 2/2004 | Ouitz | 211/104 |
| 6,736,301 B1 | * | 5/2004 | Huang | 224/500 |

* cited by examiner

*Primary Examiner*—Alvin Chin-Shue

(57) ABSTRACT

A stabilizing device for supporting a motorcycle in a storage and transport position inside an enclosed trailer. A support frame is attached to the ceiling trusses of the trailer. A telescopic arm extends downward from the support frame to connect to a cross arm including hooks and straps that attach to the motorcycle to secure the motorcycle in place. A strengthening brace is interconnected between the opposite side of the support frame and an intermediate position on the telescopic arm.

10 Claims, 5 Drawing Sheets

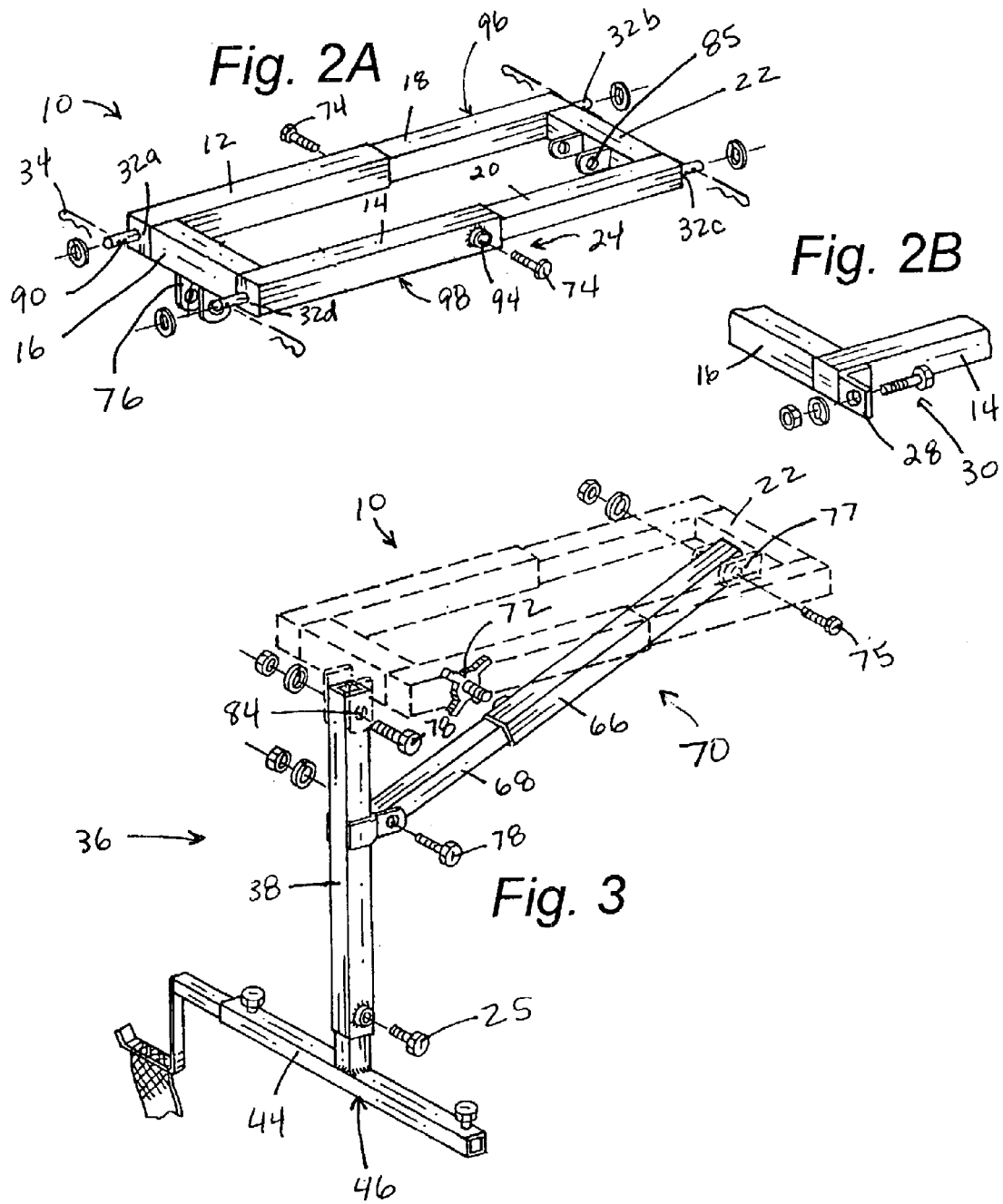

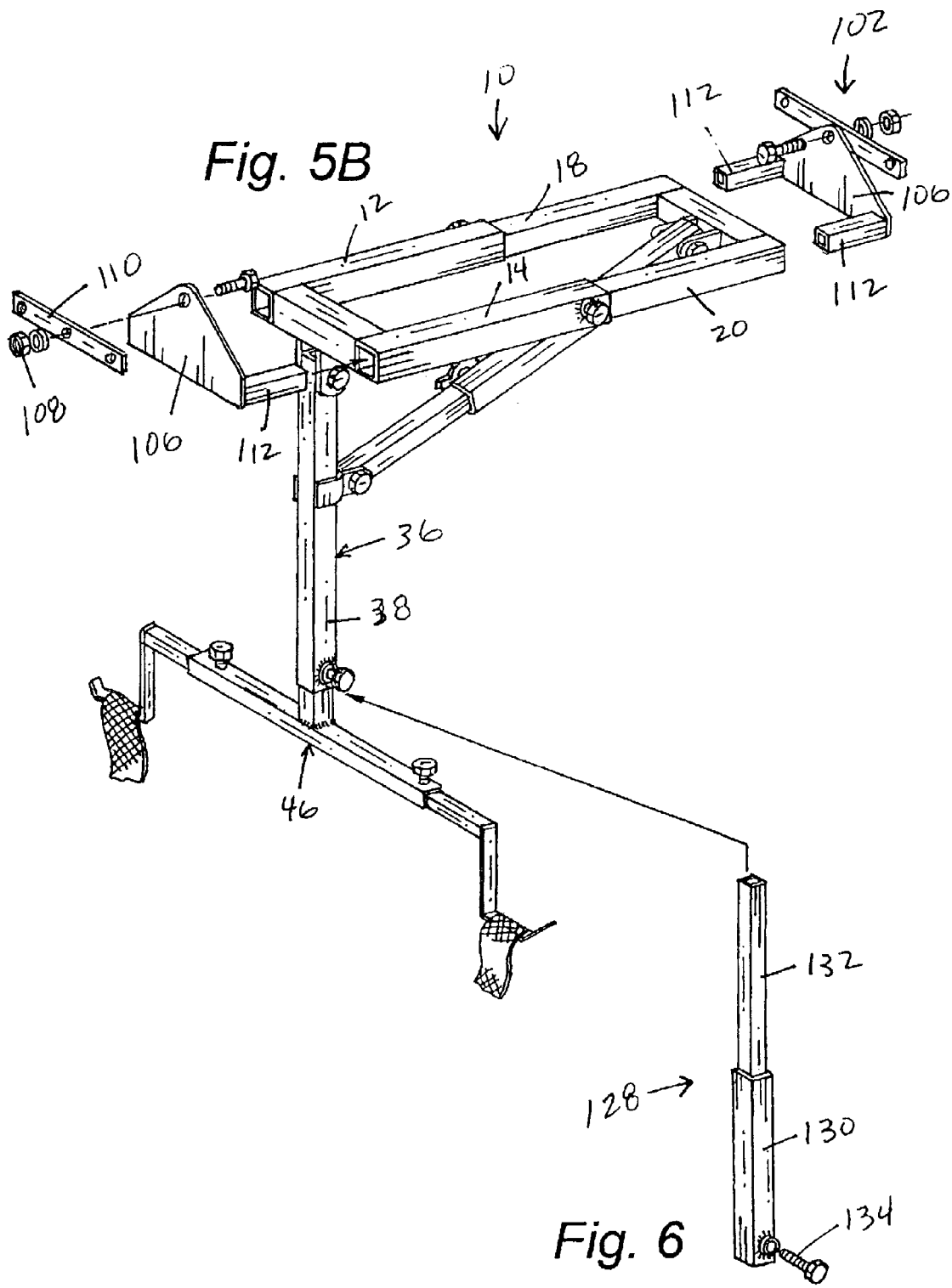

CEILING MOUNTED, ADJUSTABLE MOTORCYCLE STABILIZER

BACKGROUND OF THE INVENTION

1. Field of Invention

The present invention relates generally to a stabilizer for motorcycles during transport and, more specifically, to a device for assisting a motocross competitor in the storage and transport of the motorcycle in an enclosed trailer. In particular, the device comprises a stabilizer of steel tubing that is bolted or welded together to form an adjustable support frame attached to the ceiling of an enclosed trailer and having a telescopic arm which is suspended from the support frame and which engages and supports the motorcycle in an upright, transport position while leaving the floor and areas of the trailer adjacent the motorcycle free from obstructing objects.

2. Background

The sport of motocross has become a well-recognized activity for many adventure seekers. Problems arise, however, in reaching racetracks or courses at far distances because motorcycles used in motocross are not typically licensed for highway use. Thus, a device for transporting the motorcycles becomes necessary. When using trailers for transporting motorcycles the owners traditionally utilize grounded devices such as wheel chocks, bike shoes, tie downs, and the like in order to stabilize the motorcycle in the trailer during travel.

One drawback to the traditional means of securing motorcycles with grounding devices is that the devices used consume the floor space in the trailer. For people entering and exiting the trailer the traditional means are not easy to maneuver around nor do they provide flexibility in storing other articles. Accordingly, a need exists for a device that allows the motorcycle owner to store the motorcycle with ease while giving better flexibility for storage and better maneuverability in the trailer.

SUMMARY OF THE INVENTION

An object of the invention comprises providing a device for stabilizing a motorcycle, where the ceiling mounted device with telescopic arm provides for better storage and maneuverability inside the enclosed trailer.

These and other objects of the present invention will become apparent to those skilled in the art upon reference to the following specifications, drawings, and claims.

The present invention intends to overcome the difficulties encountered heretofore. To that end, the stabilizer for a motorcycle comprises a mounted support frame that attaches to the ceiling of a trailer. A telescopic arm is pivotally connected to and extends downwardly from a forward portion of the support frame. A cross arm is then secured at a central location to the free end of the telescopic arm, the two arms thereby forming a general "T" shape. A pair of hooked extensions are attached to the cross arm, one at each end portion thereof. A strap associated with each hooked extension is used to releasably secure each hooked extension to a corresponding end of the handlebars of the motorcycle. Finally, a brace interconnects the telescopic arm with the rearward end of the support frame at an acute angle to provide additional support.

BRIEF DESCRIPTION OF THE DRAWINGS

FIGS. 2A and 2B are an upper perspective view of the support frame of the present invention and an enlarged view of an alternative attachment structure, respectively.

FIG. 3 is a side view of the support frame showing the brace arm, and part of the suspended telescopic arm.

FIG. 5A is a front view of an adapter for trailers with curved ceilings and FIG. 5B is a side view exploded to show the connection between adaptor and the support frame.

FIG. 6 is a side view of an extension of the telescopic arm for taller or shorter motorcycles.

DETAILED DESCRIPTION OF THE INVENTION

Figure 1:
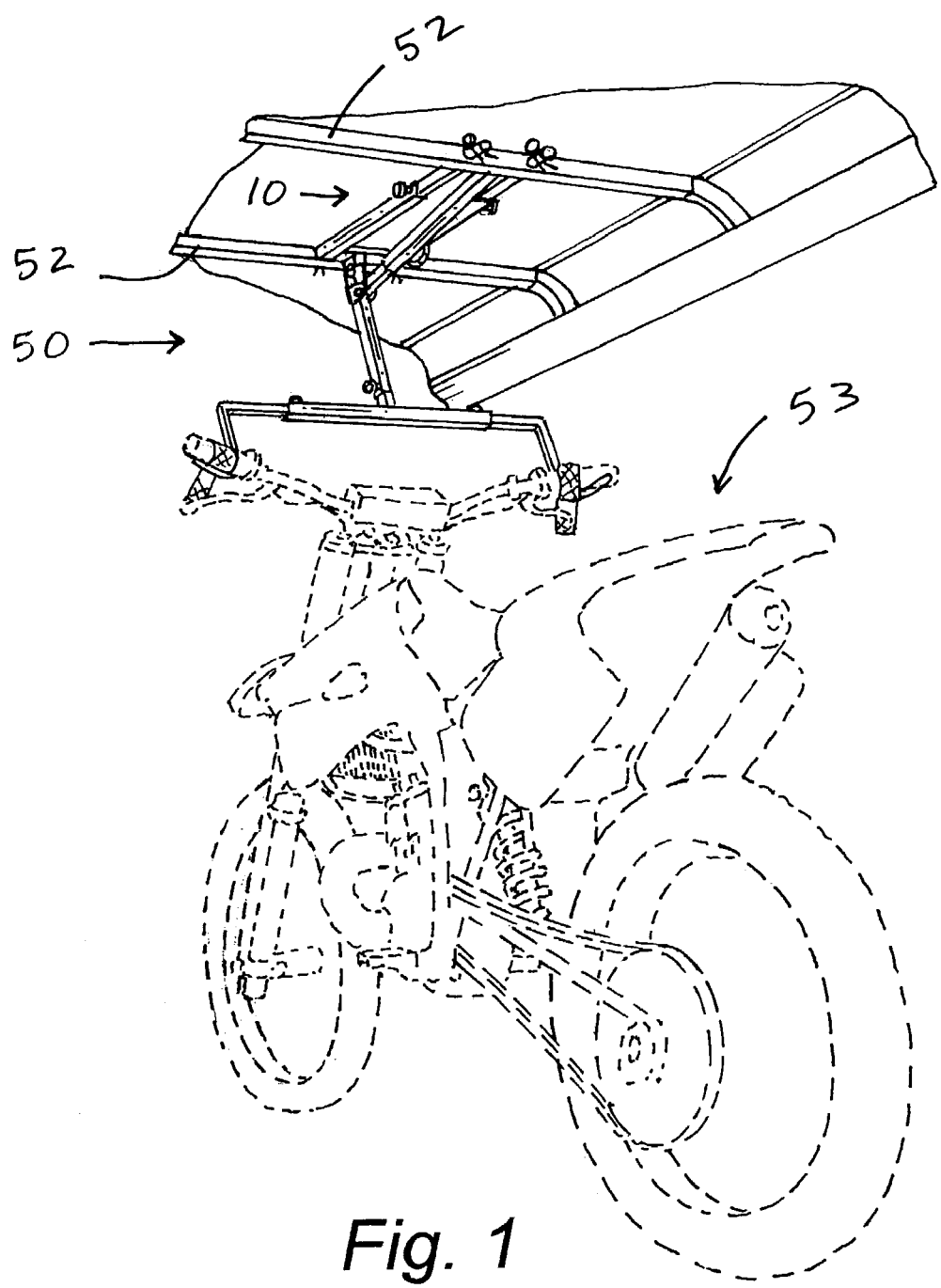
FIG. 1 is a perspective view of a stabilizer mounted to a ceiling of a trailer while supporting a motorcycle.

In the drawings, FIG. 1 shows a motorcycle stabilizer 50 of the present invention, comprising a support frame 10 that is mounted to ceiling trusses 52 of an enclosed trailer (not shown) and used to support a motorcycle 53. In particular, FIG. 2A illustrates the support frame 10 as an adjustable rectangular support frame 10 comprised of steel tubing and divided into two U-shaped sub-frames 96 and 98. The U-shaped sub-frames 96 and 98 are each comprised of two side legs 12 and 14 or 18 and 20 that are connected to a third end leg 16 or 22 (respectively) to form a first U-shaped sub-frame 98 and a second U-shaped sub-frame 96, the two sub-frames joining to form the rectangular support frame 10. The legs 18 and 20 of the first sub-frame 96 are made of small diameter steel tubing and are intended to telescope into the larger diameter legs 12 and 14 of the second sub-frame 98, and are inserted into the corresponding legs 12 and 14 to create a rectangle support frame 10 of adjustable length. A locking bolt 24 is located on the outside of each side leg 12 and 14 and is used to secure the connection between the corresponding side legs 12 and 18, and 14 and 20. The locking bolt 24 is comprised of a nut 94 welded to a hole (not shown) drilled in the steel tubing and a bolt 74 capable of turning into the nut 94 so that the bolt 74 may be tightened in order to prevent the support frame 10 from opening or closing once in position.

FIG. 2A illustrates one means for mounting the support frame 10 to the ceiling trusses 52 (FIG. 1) of the trailer. This embodiment utilizes pin blocks 32a–32d welded onto the end of each side leg 12, 14, 18, and 20 of the support frame 10. The pin blocks 32a–32d are formed by securing a mounting pin 90 to a block 92, and the pin block 32 is fit into the open end of the steel tubing of the side legs 12, 14, 18, and 20 of the support frame 10. The pin blocks 32 are used to mount the support frame 10 onto the ceiling trusses 52 of the trailer wherein the pins 90 are inserted into corresponding holes (not shown) drilled through the ceiling trusses 52 and are secured with cotter pins 34 that attach to protruding ends of the pin blocks 32. A second embodiment, illustrated in FIG. 2B, uses L-shaped brackets 28 for mounting the support frame 10 to the ceiling trusses 52. The L-shaped brackets 28 are attached to each corner of the support frame 10, in particular they are attached to the side of the steel tubes at the ends of the side legs 12, 14, 18, and 20. Holes (not shown) are drilled through the ceiling trusses 52 of the trailer and the support frame 10 is mounted to the ceiling trusses 52 by connecting the support frame 10 with a bolt and nut combination 30 to the corresponding holes in the ceiling trusses 52.

A telescoping arm 36 is suspended from the second U-shaped sub-frame 96 at the front of the support frame 10, as shown in FIG. 3. The telescoping arm 36 is assembled from two telescoping pieces of steel tubing, the pieces of tubing comprising a first tubing section 38 and a second tubing section 46, each section having a first end and a second end. The first end of the first tubing section 38 is pivotally attached to the support frame 10 by a U-shaped bracket 76, best illustrated in FIG. 2A, that is secured to the end leg 16 of the support frame 10. In this instance the U-shaped bracket 76 points downward and has holes 84 that are drilled to receive a nut and bolt combination 78 in order to secure the first tubing section 38 of the telescoping arm 36 by insertion through the holes 84 of the U-shaped bracket 76 when the first tubing section 38, having corresponding holes in the first end, is positioned in the middle of the U-shaped bracket 76. The second end of the first tubing section 38 is releasably secured to the second end of the second tubing section 46. The second tubing section 46 is inserted into the first tubing section 38 and the two are telescoped and secured with the use of a second locking bolt 25. A cross arm 44 is perpendicularly attached at a central location to the free end of the telescoping arm 36, the connection forming an inverted T-shaped end.

Figure 4:
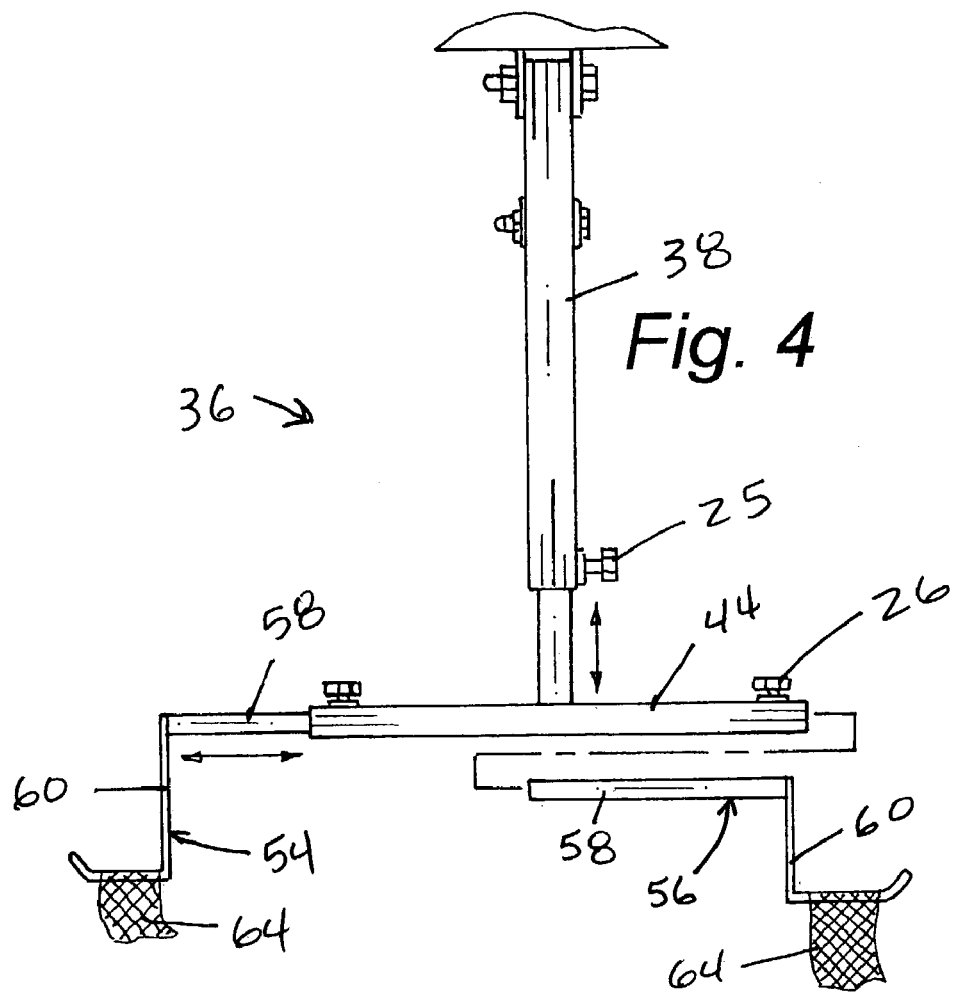
FIG. 4 is a front view of the telescopic arm and base, including the hooked extensions that attach to the motorcycle.

Shown in FIG. 4, the cross arm 44 of the telescoping arm 36 has a pair of hook extensions 54 and 56, one hook extension 54 and 56 located at each end of the cross arm 44. The hook extensions 54 and 56 secure the motorcycle to the motorcycle stabilizer 50 and are composed of long steel tubing 58 having steel angles bent to form the hook ends 60 which are welded to each piece of long steel tubing 58. The hook extensions 54 and 56, with the welded hook ends 60, slide into the ends of the cross arm 44, and provide adjustability for different sized motorcycles by sliding the hook extensions 54 and 56 to the desired width position. A locking bolt 26 is installed on the top of each end of the cross arm 44 and is used to tighten and lock the adjustment. A strap 64, preferably made out of hook and loop fastening material, is installed on each of the extension hooks 54 and 56 by sewing a loop into the strap 64. These straps 64 are wrapped and self-locked around the handlebars of the motorcycle, and further wrapped around the front brake on the last rotation to lock the motorcycle into position.

A brace 70 attaches the telescoping arm 36 to the support frame 10 (FIG. 3). The brace 70 is adjustable in length and extends between the end leg 22 of the support frame 10 and an intermediate location on the telescoping arm 36 for positioning the telescoping arm 36 as necessary for the varying motorcycle models and sizes. The brace 70 is formed of two pieces of steel tubing having different diameters, a large tube 66 and a small tube 68. The small tube 68 is inserted into the large tube 66 and is secured by a wing nut 72 located on the large tube 66, which acts like a locking bolt with an easy to use grip placed over the bolt for quickly releasing the tension in and re-positioning the brace 70.

The first end of the large tube 66 is pivotally attached to a U-shaped bracket 77 on the end leg 22 of the support frame 10. The first end of the large tube 66 is positioned in the middle of the U-shaped bracket 76 and pivotally secured by inserting a bolt 75 through the corresponding holes 85 of the U-shaped bracket 76 and the first end of the large tube 66, thus forming a pivot point. The second end of the large tube 66 accepts the first end of the small tube 68, the connection allowing for telescoping of the brace 70. The free end of the small tube 68 is pivotally attached to the telescoping arm 36 by inserting a bolt 78 through aligned holes in an attachment bracket 80 having spaced-apart ears between which the second end of the small tube 68 is received. The bracket 80 is piece welded at an intermediate position to each side of the first large tubing section 38 of the telescoping arm 36. The two pivotal attachments of the brace 70 and the telescoping movement of the large tube 66 and the small tube 68 form an angle of support that is adjusted by telescoping the large and small tubes 66 and 68 of the brace 70 as necessary for the motorcycle to be properly stabilized.

Figure 5A:
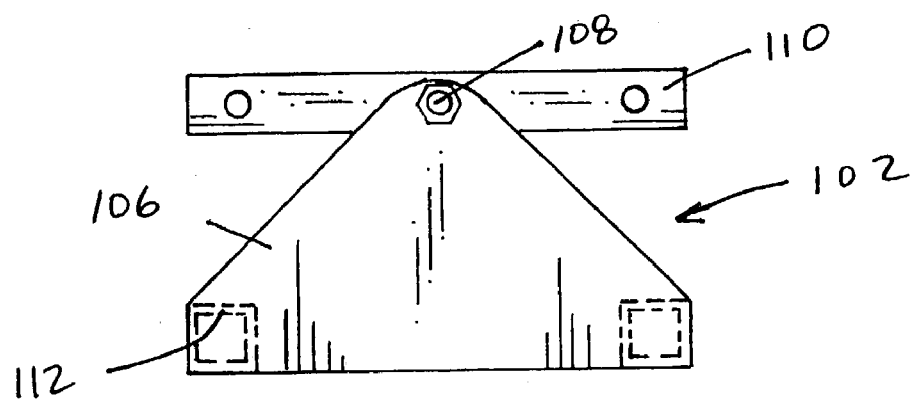

Changes may be made to the preferred embodiment described above, making it available to a wider variety of potential users owning different types of trailers or motorcycles of different heights. FIGS. 5A and 5B illustrate an alternative embodiment of an adapter for a curved ceiling. In the standard mounting support frame 10, each end of the main support frame 10 is attached to the flat trailer ceiling by bolt blocks 32 acting like pins inserted into holes drilled on the inner sides of the ceiling trusses 52. In an alternative embodiment for use with trailers having curved ceilings, two backing plate assemblies 102 are attached to the ceiling trusses 52 for mounting opposite ends of the support frame 10. The tubing assemblies 102 each include a plate 106 having a curved upper side portion and a flat lower side portion. A pair of stub legs 112 are secured by weldments or the like at the outer corners of the plate 106 adjacent the flat lower side portion and extend laterally away from the plate 106. The stub legs 112 are formed of square tubing that is sized to be received in the open end portions of the side legs 12, 14, 18, and 20. The motorcycle stabilizer 50 is mounted to the ceiling trusses 52 by a nut and bolt combination 108. Alternatively, a strap 110 may be used to strengthen the attachment of the stabilizer to the ceiling trusses 52 wherein three nut and bolt combinations are used to secure the strap 110 to the trusses 52. If desired, the upper curved portion of the plate 106 could be cut to match the ceiling curvature of an enclosed trailer.

FIG. 6 illustrates another alternative embodiment of the device. An extension 128 is provided to the telescoping arm 36 to accommodate motorcycles or trailers of different heights. The extension 128 comprises a first unit 130 having a larger diameter and a second unit 132 having a smaller diameter and inserted into the first unit 130, the two units 130 and 132 welded together. A locking bolt 134 is located at the end of the first unit 130 for telescoping with the second tubing section 46. To use the extension 128, the second tubing section 46 is removed from the first tubing section 38 and the second unit 132 of the extension 128 is telescoped into the first tubing section 38 of the telescoping arm 36. The second tubing section 46 is inserted into the first unit 130 of the extension 128, allowing the telescoping arm 36 to have a greater length to use with different sized motorcycles or with trailers of different heights.

Figure 7:
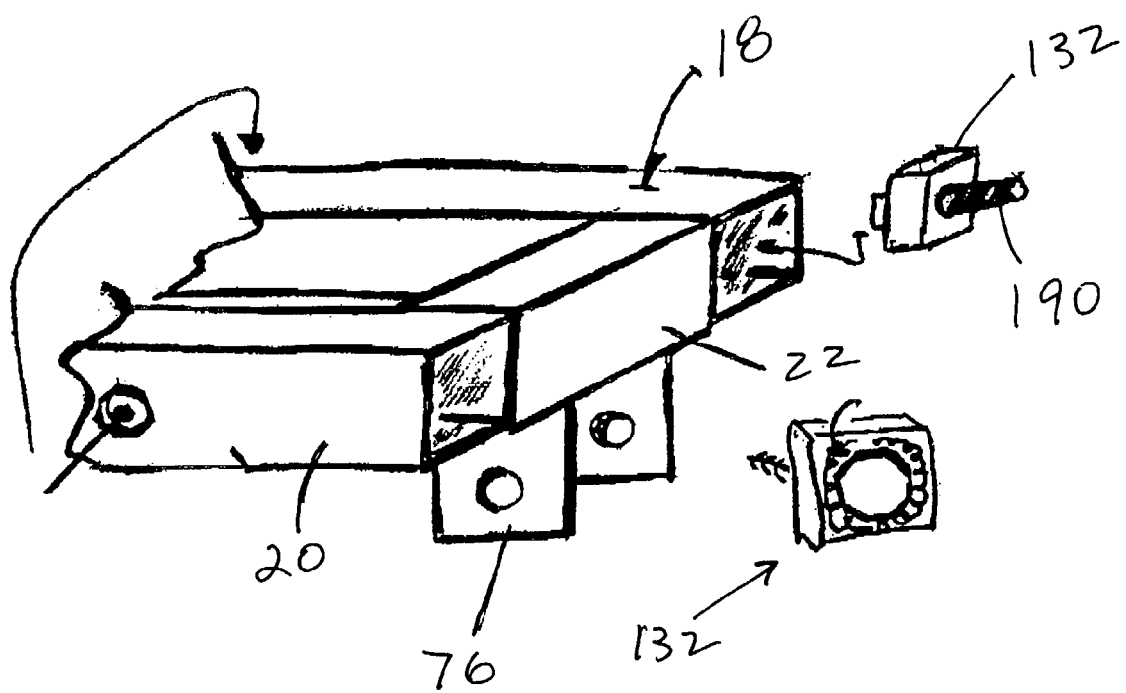
FIG. 7 is a close-up view of a bolt block that is attached to the ends of the support frame and secure the support frame to the ceiling trusses.

An alternative to the pin blocks 32 (FIG. 2A) is illustrated generally at 132 in FIG. 7. Instead of a pin 90, a bolt 190 is used and a nut (not shown) is threaded on the bolt 190 to secure the frame 10 to the ceiling trusses 52.

Typically, ceiling trusses 52 of a trailer run transversely of the trailer (FIG. 1) and permit positioning of the stabilizer 50 at any desired position transversely of the trailer between any pair of trusses. A further alternative embodiment of the present invention comprises the use of a pair of parallel tracks mounted on the ceiling of the trailer perpendicular to the ceiling trusses 52. The tracks are spaced apart by the width of the frame 10. Clamps or other suitable means are used to attach the frame to the tracks at any desired position along the tracks. The tracks, accordingly, provide unlimited longitudinal adjustability of the position of the stabilizer 50 in the trailer within the length of the tracks.

Further, while the motorcycle stabilizer 50 has been described as including a frame that is rectangular, having a pair of parallel sides, an alternative embodiment comprises only a single mounting element, secured at either end to the ceiling trusses 52 and which supports the telescoping arm 36 in the same manner described above.

In the preferred embodiment illustrated in FIG. 2A, side legs 12 and 14 of support frame 10 consist of steel tubing of 1" width and cut to a length of 16". These arms are welded to the end leg 16, which is composed of 1" width steel tubing of 6" length, forming the fist half of the U-shaped sub-frame 96. The support frame 10 also includes the second U-shaped sub-frame 98, with side legs 18 and 20 consisting of steel tubing of ¾" width and 12" length, and the end leg 22 of 1" width steel tubing, 6" in length. The support frame 10 creates a rectangle of adjustable length measuring 8"×18" closed, with an overlap of 13". The support frame 10 can be opened to the maximum position of 8"×28" to hold a motorcycle of approximately 225 to 300 lbs without bending the ceiling trusses 52 or collapsing the support frame 10. The ceiling trusses 52 of the trailer, however, limit the weight support capability.

With the main support frame 10 complete, the bolt blocks 32*a*–32*d* attached to the ends of the side legs 12, 14, 18, and 20 slip into a ⅜" hole on the inner sides of the trusses 52. On the end leg 16 the steel arms of the U-shaped bracket 76 are each 1½"×1" and welded 1" apart on center. The other second U-shaped bracket 76 on the end leg 22 also has steel arms sized at 1½"×1" and welded 1" apart on center.

In FIG. 3, the telescoping arm 36 is composed of the second tubing section 40, the tubing measuring ¾"×12" and the first tubing section 38 tubing measuring 1"×12." The nut 94 at the end of the 1" diameter tubing is either ¼" or ⅜" in size The cross arm 44 is composed of a 16" length piece of 1" diameter steel tubing. The holes drilled on the ends of the cross arm 44 tubing are drilled halfway and ¼" nuts 94 are welded to these holes.

Holes are drilled completely through ½" on center on top of the 1"×12" end of the large tube 66 of the brace 70. The pivotal attachment is created by inserting a ⅜" bolt 78 through the U-shaped bracket 76. The two pieces of bent stock 80 are welded approximately 2½" down from the angle of support hinge 82 on the telescoping arm 36. The bend in the two pieces of bent stock 80 goes from a 1" tube to a ¾" tube in the hinge area. The small tube 68 of the brace 70 is composed of ¾"×16" steel tubing and the large tube 66 is composed of 1"×16" steel tubing.

In FIG. 4, the extension arms 54 and 56 are comprised of extension tubes 58 each being ¾"×8" lengths of steel tubing and hooks 60 which are made from ½" steel angles. The set bolts 62 installed into the welded nuts 94 on each end of the extension arms 54 and 56 are the size ¼" or ⅜".

In FIG. 5, for the alternative embodiment of the adapter, the two backing plates 102 and 104 are measured at ⅛"×12"×1" and the legs 112 and 114 are composed of ¾" width and 4" length steel tubing. Similarly, legs 118 and 120 are composed of ½" width and 4" length steel tubing. A ⅜" bolt 74 with nut and washer combination is utilized to mount 106 and 108 to the backing plates 102 and 104.

In FIG. 6, for the alternative embodiment of the extension 128 the first unit 130 is composed of 1" diameter steel tubing at a length of 12", and the second unit 132 is composed of ¾" diameter steel tubing at a length of 12". Thus, the extension 128 gives an actual increase in length of 20" to the motorcycle stabilizer 50. The extension 128 can actually be produced to give an actual increase in length of 10" by replacing the first unit 130 and the second unit 132 with 6" lengths of steel tubing, using the same method of assembly.

The foregoing description and drawing comprises an illustrative embodiment of the present invention. The foregoing embodiments and the methods described herein may vary based on the ability, experience, and preference of those of ordinary skill in the art. Merely listing the steps of the method in a certain order does not constitute any limitation on the order of the steps of the method. The foregoing description and drawings merely explain and illustrate the invention and the invention is not limited thereto except insofar as the claims are so limited. It is anticipated that those of ordinary skill in the art with this disclosure before them will be able to make modifications in variations therein without departing from the scope of the invention.

I claim:

1. A device for stabilizing and storing a motorcycle in a trailer, the device comprising:
   a) a support frame secured to the ceiling of the trailer, wherein the support frame comprises an adjusting rectangle of steel tubing comprised of two U-shaped sub-frames of steel tubing, wherein one of the U-shaped sub-frames has smaller diameter arms and the second U-shaped sub-frame has larger diameter arms, with the smaller diameter arms of the U-shaped sub-frame intended to telescope into the larger diameter arms of the other U-shaped sub-frame;
   b) a telescoping arm suspended from a first end portion of the support frame;
   c) a cross arm secured to the telescoping arm opposite the first end portion,
   d) a means for releasably securing a motorcycle at the motorcycle's handlebars to the cross arm; and
   e) a brace pivotally attached to the telescoping arm, wherein said brace comprises an arm of adjustable length extending between a side of the support frame opposite said first end portion and an intermediate location on the telescoping arm.

2. The device as defined in claim 1, wherein the telescoping arm comprises a first tubing section having a first end and a second end and a second tubing section having a first end and a second end wherein the first end of the first tubing section is pivotally secured centrally of one side of the support frame, and wherein the first end of the second tubing section is releasably secured to the second end of the first arm at a telescopically adjusted position.

3. The device as defined in claim 1, wherein said cross arm comprises steel tubing welded to the second end of the second tubing section of the telescopic arm, as to form an upside-down "T."

4. The device as defined in claim 3, wherein the cross arm further comprises hooked extensions of steel tubing telescoped into either end portion of the cross arm.

5. The device as defined in claim 4, wherein the hooked extensions further comprise a strap, for releasably securing the motorcycle to the cross arm.

6. The device as defined in claim 5, wherein the motorcycle includes a hand-activated brake and said strap is capable of releasably engaging the hand-activated brake.

7. The device as defined in claim 1, wherein the ceiling of the trailer includes a pair of parallel trusses and wherein the support frame is capable of being releasably secured between the pair of trusses at an adjustable position.

8. The device as defined in claim 1, wherein the support frame comprises an adjusting unit of steel tubing comprised of two steel tube units having different diameters, with the smaller diameter tube unit intended to telescope into the larger diameter tube of the other steel tube unit.

9. The device as defined in claim 1, wherein the pivoting telescopic arm and pivoting brace allow the device to collapse and lie flat on the ceiling when not in use.

10. The device as defined in claim 1, wherein the brace allows the cross arm to be selectively positioned fore and aft in the trailer.

* * * * *